United States Patent
Cho et al.

(10) Patent No.: US 8,412,223 B2
(45) Date of Patent: *Apr. 2, 2013

(54) METHOD OF ALLOCATING RADIO RESOURCE IN BROADBAND WIRELESS ACCESS SYSTEM

(75) Inventors: Hee Jeong Cho, Gyeonggi-do (KR); Ki Seon Ryu, Gyeonggi-do (KR); Jae Won Lim, Gyeonggi-do (KR); Jeong Ki Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 378 days.

This patent is subject to a terminal disclaimer.

(21) Appl. No.: 12/738,237

(22) PCT Filed: Oct. 15, 2008

(86) PCT No.: PCT/KR2008/006076
§ 371 (c)(1),
(2), (4) Date: Apr. 30, 2010

(87) PCT Pub. No.: WO2009/051402
PCT Pub. Date: Apr. 23, 2009

(65) Prior Publication Data
US 2010/0208684 A1    Aug. 19, 2010

(30) Foreign Application Priority Data
Oct. 18, 2007   (KR) .................. 10-2007-0105220

(51) Int. Cl.
*H04W 72/00*   (2009.01)

(52) U.S. Cl. .................................................. 455/452.2
(58) Field of Classification Search ............. 455/452.2, 455/452.1, 450, 422.1
See application file for complete search history.

(56) References Cited

U.S. PATENT DOCUMENTS

2006/0189321 A1* 8/2006 Oh et al. .................... 455/452.2
2006/0264218 A1 11/2006 Zhang et al.
2007/0110104 A1 5/2007 Sartori et al.

FOREIGN PATENT DOCUMENTS

KR   10-2006-0078667 A   7/2006

* cited by examiner

*Primary Examiner* — William D Cumming
(74) *Attorney, Agent, or Firm* — Birch, Stewart, Kolasch & Birch, LLP

(57) ABSTRACT

A method and device for allocating resource regions in a broadband wireless access system. The method includes receiving a message from a base station by a mobile terminal. The message includes allocation information used to collectively and consecutively allocate identical resource regions of consecutive frames. The identical resource regions include identical Orthogonal Frequency-Division Multiple Access (OFDMA) symbols and identical subchannels within each of the identical resource regions. The identical OFDMA symbols are a subset of a total number of OFDMA symbols within each of the identical resource regions. The identical subchannels are a subset of a total number of subchannels within each of the identical resource regions. The method also includes transmitting or receiving data by the mobile terminal through the allocated identical resource regions.

10 Claims, 4 Drawing Sheets

RELATED ART  FIG. 1

METHOD OF ALLOCATING RADIO RESOURCE IN BROADBAND WIRELESS ACCESS SYSTEM

TECHNICAL FIELD

The present invention relates to a method for allocating resource regions in a wireless access system, and more particularly, to a method for collectively allocating resource regions of consecutive frames.

BACKGROUND ART

First, reference is made to a general method for allocating uplink resources in a broadband wireless access system. A base station allocates resources taking into consideration a channel status (i.e., Channel Quality Information (CQI)), the amount of data delay, throughput, and Quality of Service (QoS) of each mobile terminal.

Here, a Proportionally Fairness Scheduler (PFS) is used to determine mobile terminals that will use Partial Usage of Subchannels (PUSCs) including distributed subcarriers of the OFDMA system. One frame can be divided into a number of scheduling resources. The base station sequentially performs PFS until all scheduled resources are allocated. This process is repeated every frame.

According to the PFS result, the base station can allocate one or more mobile terminals to one frame. PFS is a method used to select mobile terminals which maximizes the value obtained by dividing the maximum amount of data $T\_inst_i(t)$ according to a channel status at a scheduling time "t" by the average amount of actually transmitted data $T\_smoothed_i(t)$ as in the following Equation 1. Here, the process of Equation 1 is not performed when there is no data to be transmitted to the mobile terminals.

$$M_i(t) = \frac{T\_inst_i(t)}{T\_smoothed_i(t)} \qquad \text{[Equation 1]}$$

At any scheduling instant t, the scheduling metric $M_i(t)$ for subscriber i

The average data amount $T\_smoothed_i(t)$ which is a denominator in Equation 1 is calculated each time after resources are allocated as in the following Equation 2. A parameter "$T_{PF}$" in Equation 2 represents the size of a window during which the service can be maintained without receiving data. In Equation 2, the current transmission amount "$T\_inst_i$" of all mobile terminals excluding mobile terminals selected at time "t" is "0".

$$T\_smoothed_i(t) = \qquad \text{[Equation 2]}$$
$$\frac{1}{T_{PF}} * T\_inst_i(t) + \left(1 - \frac{1}{T_{PF}}\right) * T\_smoothed_i(t-1)$$

The following Table 1 represents QoS of various services. The Unsolicited Grant Service (UGS) is sensitive to transmission delay and the sensitivity of each service to transmission delay decreases in the order given in the table (i.e., the Best Effort (BE) is least sensitive to transmission delay).

TABLE 1

| Service | Definition | Applications | Mandatory QoS Parameters |
|---|---|---|---|
| UGS (Unsolicited Grant Service) | Real-time data streams consisting of fixed-size data Packets issued at periodic Intervals | T1/E1, VoIP w/o silence Suppression | Max. Sustained Traffic Rate Min. Reserved Traffic Rate Maximum Latency Tolerated Jitter Uplink Grant Scheduling Type Request/Transmission Policy Unsolicited Grant Interval (Vendor specific) |
| rtPS | Real-time data streams consisting of variable-sized data packets that are issued at periodic intervals | MPEG video | Minimum Reserved Traffic Rate Maximum Sustained Traffic Rate Maximum Latency Uplink Grant Scheduling Type Request/Transmission Policy |
| nrtPS | Delay-tolerant data streams consisting of variable-sized data packets for which minimum data rate is required | FTP | Minimum Reserved Traffic Rate Maximum Sustained Traffic Rate Traffic Priority Uplink Grant Scheduling Type Request/Transmission Policy |
| BE | Data streams for which no Minimum service level is required and therefore may be handled on a space-available basis | HTTP | Maximum Sustained Traffic Rate Traffic Priority Request/Transmission Policy |

Information of uplink resources allocated using the method described above is transmitted to each mobile terminal through a UL-MAP message every frame. That is, when a mobile terminal transmits uplink data to the base station, the mobile terminal must utilize multiple frames in order to transmit the entirety of the data.

In order to transmit data to the base station, the mobile terminal attempts to make an uplink allocation request (i.e., a Bandwidth Request (BR)) for the uplink. The mobile terminal can request uplink resources of up to 524,287 bytes using a BR header, a BR and UL Tx power report header, a BR and CINR report header, a BR and UL sleep control header, etc.

For example, when it is assumed that only one mobile terminal in a cell desires to receive a File Transfer Protocol (FTP) service with a mean size of 19,500 bytes or a Hypertext Transfer Protocol (HTTP) service with a mean size of 34,500 bytes, the mobile terminal must utilize multiple frames in order to transmit the entirety of data.

In addition, in the case where the cell includes a large number of mobile terminals which receive a variety of services, the mobile terminals must share resources remaining after resources are allocated to a service with QoS higher than that of FTP or HTTP. Thus, each mobile terminal will transmit data through a larger number of frames.

FIG. 1 illustrates a general method in which a Base Station (BS) allocates uplink resource regions to a mobile terminal or Mobile Station (MS).

As shown in FIG. 1, the BS allocates wireless resources to the MS through a UL-MAP message (S101). At step S101, the BS allocates a frame including a transmission region to allow the MS to transmit data to the BS.

The MS transmits data to the BS using transmission information allocated to one frame included in the UL-MAP message received at step S101 (S102).

When the MS has not yet transmitted the entirety of the data, the MS requests that the BS allocate resources to the MS and the BS then reallocates a transmission region of one frame to the MS using a UL-MAP message (S103).

The MS transmits data to the BS through the transmission region of the frame allocated at step S103 (S104) and these steps are repeated every frame until the MS transmits the entirety of the data (S105 and S106).

DISCLOSURE

Technical Problem

As shown in FIG. 1, the BS needs to allocate a resource region required to transmit data to the MS every frame. Thus, significant overhead may occur since the BS needs to repeatedly transmit a UL-MAP message to the MS in order to allocate a resource region to the MS.

In addition, transmission of allocation information on a frame-by-frame basis may be inefficient since it is likely that a specific interval is allocated to only one MS due to the characteristics of the PFS.

An object of the present invention devised to solve the above problems lies in providing a method for efficiently allocating resources.

Another object of the present invention devised to solve the problem lies in providing a method in which consecutive frames are collectively allocated for efficient allocation of resources to reduce network overhead.

Technical Solution

The object of the present invention can be achieved by providing a method for allocating resource regions in a wireless access system, wherein resources are collectively allocated in consecutive frames.

In one aspect of the present invention, provided herein is a method for allocating resource regions in a broadband wireless access system, the method including receiving a message, including allocation information used to collectively and consecutively allocate identical resource regions, from a base station, and transmitting data through the allocated resource regions.

In this method, the message may include information indicating an uplink resource allocation start time. The allocation information may include an extended Uplink Interval Usage Code (UIUC). The message may include subchannel offset information, the number of subchannels, OFDMA symbol offset information, the number of OFDMA symbols, and the number of allocated frames. The message may include slot offset information, duration of an allocated slot, and the number of allocated frames. The step of transmitting the data may include consecutively transmitting the data through identical wireless resource regions using the allocation information included in the message.

In another aspect of the present invention, provided herein is a method for allocating wireless resources in a broadband wireless access system, the method including transmitting a message, including a parameter used to collectively and consecutively allocate identical wireless resource regions, to a mobile terminal, and receiving data through the allocated wireless resource regions.

In this method, the message may include information indicating an uplink resource allocation start time. The method may further include transmitting a message to the mobile terminal, wherein the message includes corrected allocation information used to allocate a corrected resource region to the mobile terminal.

Advantageous Effects

The present invention has the following advantages.

First, the number of transmissions of a MAP message is reduced since identical transmission regions are collectively allocated in multiple frames. This reduces MAP overhead in a network.

Second, signaling overhead of the mobile terminal is reduced since it is unnecessary for the mobile terminal to repeatedly receive a message to transmit data.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Figure 1:
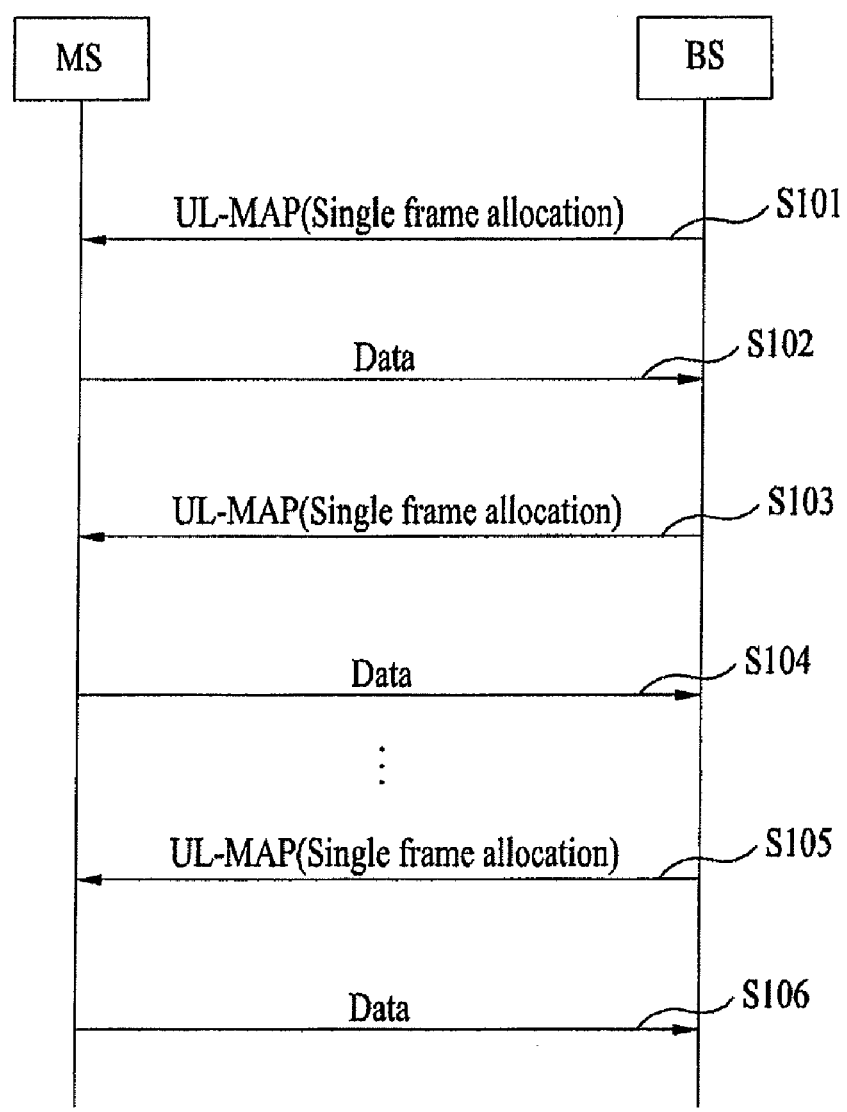
FIG. 1 illustrates a general method in which a Base Station (BS) allocates uplink resource regions to a mobile terminal or Mobile Station (MS).

To overcome the above problems, the present invention provides a method for allocating resources in a wireless access system wherein resources are collectively allocated in consecutive frames.

The following embodiments are provided by combining components and features of the present invention in specific forms. The components or features of the present invention should be considered optional if not explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment.

The embodiments of the present invention can be supported by standard documents of at least one of the IEEE 802 system, the 3GPP system, the 3GPP LTE system, and the 3GPP2 system which are wireless access systems. That is, steps or portions that are not described in the embodiments of the present invention for the sake of clearly describing the technical idea of the present invention can be supported by the standard documents. For all terms used in this disclosure, reference can be made to the standard documents. Especially, the embodiments of the present invention can be supported by at least one of P802.16-2004, P802.16e-2005, and P802.16Rev2 which are standard documents of the IEEE 802.16 system.

Specific terms used in the following description are provided for better understanding of the present invention and can be replaced with other terms without departing from the technical idea of the present invention.

The embodiments of the present invention have been described focusing mainly on the data communication relationship between a mobile terminal and a Base Station (BS). The BS is a mobile terminal node in a network which performs communication directly with the mobile terminal. Specific operations which have been described as being performed by the BS may also be performed by an upper node above the BS as needed.

That is, it will be apparent to those skilled in the art that the BS or any other network node may perform various operations for communication with mobile terminals in a network including a number of network nodes including BSs. The term "base station (BS)" may be replaced with another term such as "fixed station", "Node B", "eNode B (eNB)", or "access point". The term "mobile terminal" may also be replaced with another term such as "user equipment (UE)", "mobile station (MS)", "terminal", or "mobile subscriber station (MSS)" etc.

The embodiments of the present invention can be implemented by hardware, firmware, software, or any combination thereof. In the case where the present invention is implemented by hardware, methods according to the embodiments of the present invention may each be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case where the present invention is implemented by firmware or software, methods according to the embodiments of the present invention may each be implemented in the form of modules, processes, functions, or the like which perform the features or operations described above. Software code can be stored in a memory unit so that a processor can execute it. The memory unit may be located inside or outside the processor and can communicate data with the processor through a variety of known means.

Reference will now be made to an example wherein a Base Station (BS) allocates uplink resources to a mobile terminal or Mobile Station (MS).

The BS can transmit uplink resource information to the MS through a UL-MAP message. Here, in order to transmit uplink resource information to the MS, the BS can use a block allocation scheme in which the BS notifies the MS of an OFDM symbol offset, the number of allocated OFDM symbols, a subchannel offset, and the number of allocated subchannels or a slot allocation scheme in which the BS notifies the MS of subchannel offset information and durations of allocated slots.

The block allocation scheme can be used in fast feedback (UIUC=0), HARQ ACK CH region (UIUC-11 (Extended-2 UIUC) with Type=8), CDMA ranging and BW request allocation (UIUC=12), and PAPR/safety zone allocation (UIUC=13).

The slot allocation scheme can be used for any case where the block allocation scheme is not used. When the slot allocation scheme is used in Non-Adaptive Antenna System (Non-AAS) zones, the start position of an initial region can be determined by an "Allocation Start Time" field in the UL-MAP message and the start positions of other allocation regions can be determined through relative offset values in the UL-MAP message.

However, when the slot allocation scheme is used in an AAS UL zone, the start position of the allocation region can be determined by absolute offset information explicitly indicated in the UL-MAP message.

The following Table 2 illustrates the usage of an Uplink Interval Usage Code (UIUC) used in the block allocation scheme or the slot allocation scheme.

TABLE 2

| UIUC | Usage |
| --- | --- |
| 0 | Fast-Feedback channel |
| 1-10 | Different burst profiles(Data Grant Burst Type) |
| 11 | Extended UIUC 2 IE |
| 12 | CDMA BR, CDMA ranging |
| 13 | PAPR reduction allocation, safety zone, Sounding Zone |
| 14 | CDMA Allocation IE |
| 15 | Extended UIUC |

The embodiments of the present invention will now be described with reference to the accompanying drawings. Although the following embodiments are described with reference to uplink as an example, the embodiments may also be applied to downlink according to a system status or a request from a user.

Figure 2:
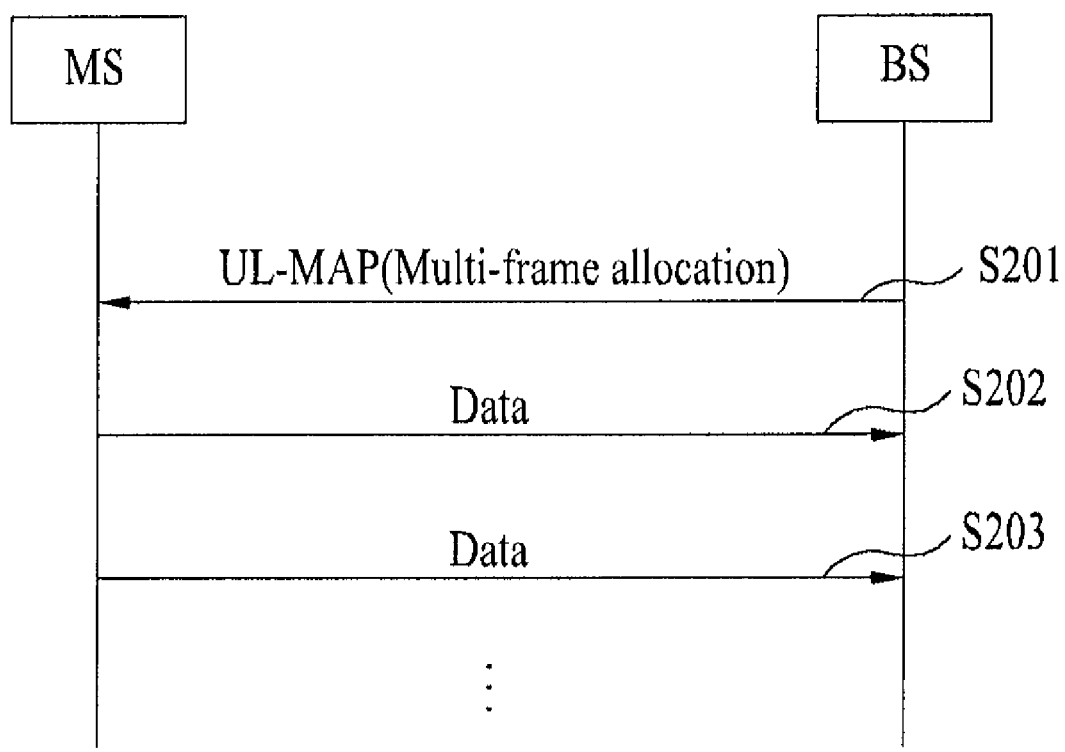
FIG. 2 illustrates a method in which a number of frames are consecutively allocated to an MS according to an embodiment of the present invention.

FIG. 2 illustrates a method in which a number of frames are consecutively allocated to a Mobile Station (MS) according to an embodiment of the present invention.

In the method of FIG. 2, multi-frame allocation information (specifically, a multi-frame allocation IE) is defined using an extended UIUC parameter in order to consecutively allocate wireless resources.

As shown in FIG. 2, the BS can transmit a UL-MAP message containing a multi-frame allocation IE to the MS in order to consecutively allocate multiple frames to the MS. In this case, resource regions with the same size can be consecutively allocated to specific frames at the same position thereof (S201).

Table 3 illustrates an example format of the multi-frame allocation IE that can be used at step S201.

TABLE 3

| Syntax | Size | notes |
| --- | --- | --- |
| multi-frame allocation IE { | — | — |
| Extended UIUC | 4 | 0x0B |
| Length | 4 | 0x05 |
| UIUC | 4 | Allowed values are 1-10 |
| Repetition coding indication | 2 | 0b00: No repetition coding<br>0b01: Repetition coding of 2 used<br>0b10: Repetition coding of 4 used<br>0b11: Repetition coding of 6 used |
| OFDMA Symbol offset | 8 | |
| Subchannel offset | 7 | |
| No. OFDMA Symbols | 7 | |
| No. Subchannels | 7 | |
| No. frames | 2 | Max 0x04 |

TABLE 3-continued

| Syntax | Size | notes |
| --- | --- | --- |
| Reserved | 3 | |
| } | | |

Table 3 illustrates the case where the block allocation scheme is used as a resource allocation scheme. The BS can consecutively allocate resources to the MS using the block allocation scheme. Here, it is assumed that the MS can recognize extended UIUC parameters. In addition, the BS can set a repetition coding indication field to notify the MS of the number of repetitions of coding. The repetition coding indication field can indicate the number of frames to which transmission regions are consecutively allocated.

The BS can notify the MS of an OFDMA symbol offset, the number of OFDMA symbols, a subchannel offset, and the number of subchannels indicating allocated positions of transmission regions using the multi-frame allocation IE of Table 3. The BS can notify the MS of the number of consecutive frames in which specific transmission regions are fixedly allocated using the multi-frame allocation IE. The MS can recognize consecutively allocated data transmission regions based on the multi-frame allocation IE included in the UL-MAP message.

Table 3 is able to use in a system with frames, each of 20 ms or less, preferably.

Table 4 illustrates another example format of the multi-frame allocation IE that can be used at step S201.

TABLE 4

| Syntax | Size | notes |
| --- | --- | --- |
| Reduced multi-frame allocation IE { | — | — |
| Extended UIUC | 4 | 0x0B |
| Length | 4 | 0x04 |
| UIUC | 4 | Allowed values are 1-10 |
| Repetition coding indication | 2 | 0b00: No repetition coding |
| | | 0b01: Repetition coding of 2 used |
| | | 0b10: Repetition coding of 4 used |
| | | 0b11: Repetition coding of 6 used |
| OFDMA Symbol offset | 6 | |
| Subchannel offset | 7 | |
| No. OFDMA Symbols | 5 | |
| No. Subchannels | 6 | |
| No. frames | 2 | Max 0x04 |
| } | | |

Table 4 can be used in a system with frames, each of 5 ms or less. The functions of the reduced multi-frame allocation IE are similar to those of the multi-frame allocation IE of Table 3. Table 3 or Table 4 can be selectively used depending on the size of each frame.

Table 5 illustrates another example format of the multi-frame allocation IE that can be used at step S201.

TABLE 5

| Syntax | Size | notes |
| --- | --- | --- |
| Multi-frame allocation IE { | — | — |
| Extended UIUC | 4 | 0x0B |
| Length | 4 | 0x04 or 0x03 |
| UIUC | 4 | Allowed values are 1-10 |
| Repetition coding indication | 2 | 0b00: No repetition coding |
| | | 0b01: Repetition coding of 2 used |
| | | 0b10: Repetition coding of 4 used |
| | | 0b11: Repetition coding of 6 used |
| Duration | 10 | In OFDMA slots |
| Offset included | 1 | If 1, slot offset is included in IE |
| If (Offset included ==1) { | | |
| Slot offset | 10 | |
| } | | |
| No. frames | 2 | Max 0x04 |
| Padding | — | 3 0r 5 |
| } | | |

Table 5 illustrates the case where the slot allocation scheme is used as a resource allocation scheme. The BS can consecutively allocate transmission resource regions to the MS using the slot allocation scheme. In this case, it is assumed that the MS can recognize extended UIUC parameters.

The BS can set an "offset included" parameter in first multi-frame allocation IE to "1" in Table 5.

For example, in case of the BS transmits multi-frame allocation IE to one or more MSs using UL-MAP message, if the BS provides slot offset information to a first MS among the MSs then wireless resources of subsequent regions can be allocated to the remaining MSs. The Slot offset information is included to the multi-frame allocation IE.

That is, since it is not necessary to provide slot offset information to the other MSs, the "offset included" parameter can be set to "0" so that offset information need not be included. When the "offset included" parameter is set to "0", the "Length" parameter can be set to "0x03" and padding bits can be set to "5".

Returning to FIG. 2, the MS can transmit data to the BS through identical transmission regions of frames, which have been consecutively allocated, using the allocation information included in the message received at step S201 (S202 and S203).

Using the method describe above, the BS can transmit a UL-MAP message to the MS in consecutive frames, instead of transmitting a UL-MAP message every frame (i.e., on a frame-by-frame basis). This reduces MAP overhead in a network and the number of internal signaling messages. Thus, the MS and the BS can more efficiently transmit and receive data.

Figure 3:
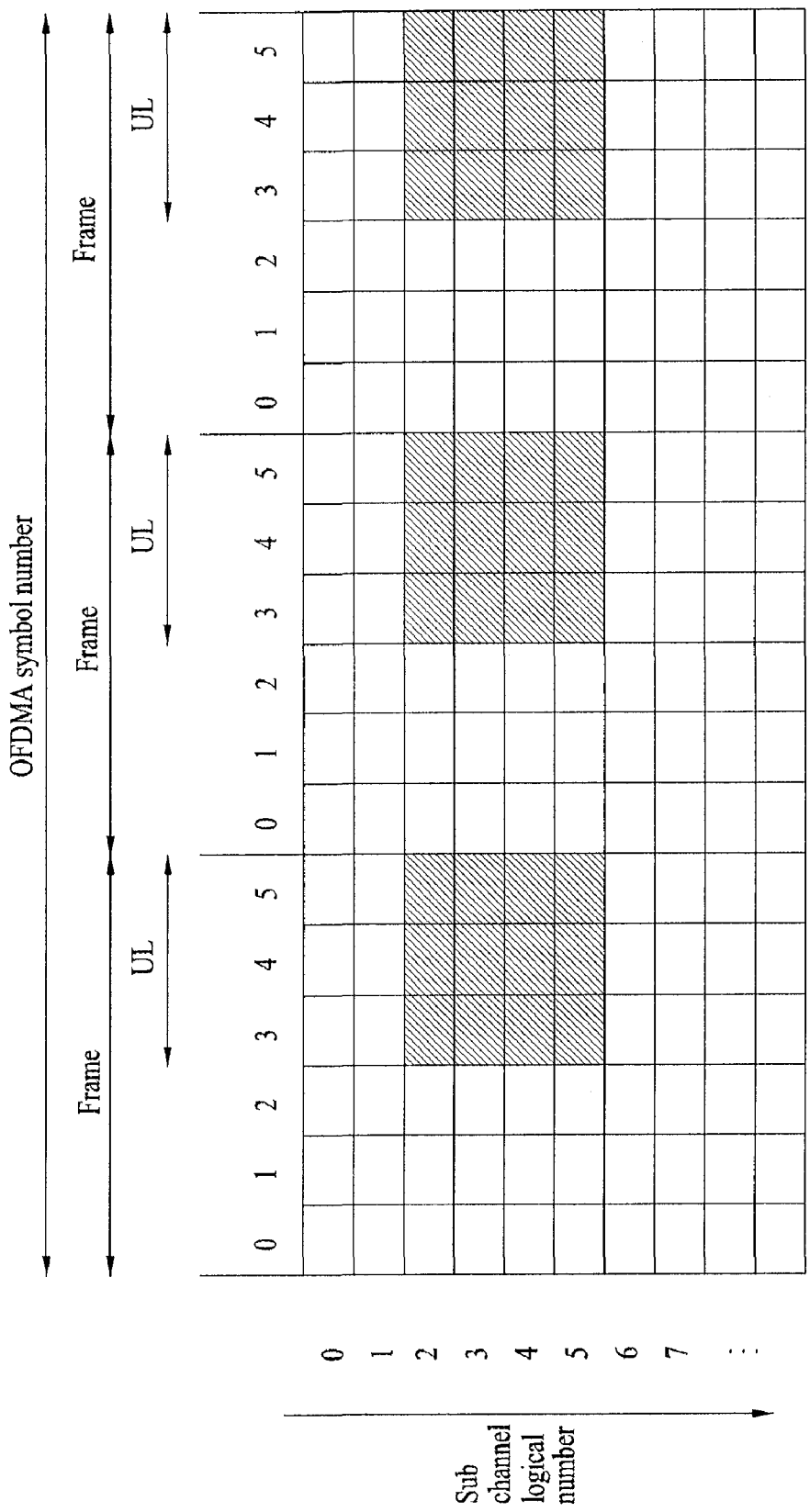
FIG. 3 illustrates how resources are allocated when the number of frames in multi-frame allocation information is "3" according to an embodiment of the present invention.

FIG. 3 illustrates how resources are allocated when the number of frames in a multi-frame allocation IE is "3" according to an embodiment of the present invention.

A horizontal axis in FIG. 3 represents the temporal order of OFDMA symbols and a vertical axis represents logical positions of subchannels.

Specifically, FIG. 3 illustrates how the BS allocates transmission regions used to transmit uplink data to an MS using the multi-frame allocation IE. Here, the BS can allocate the same (or identical) transmission region to each frame for uplink transmission. That is, in an embodiment of the present invention, the BS can consecutively and collectively allocate regions of three frames, corresponding to OFDMA symbols 3, 4, and 5 and subchannels 2, 3, 4, and 5 in each frame, to the MS.

As shown in FIG. 3, when the MS is allocated a multi-frame in a UL-MAP message received in a specific frame, the MS can use the same allocation regions not only in the specific frame through which the UL-MAP message has been received but also in two subsequent frames.

Figure 4:
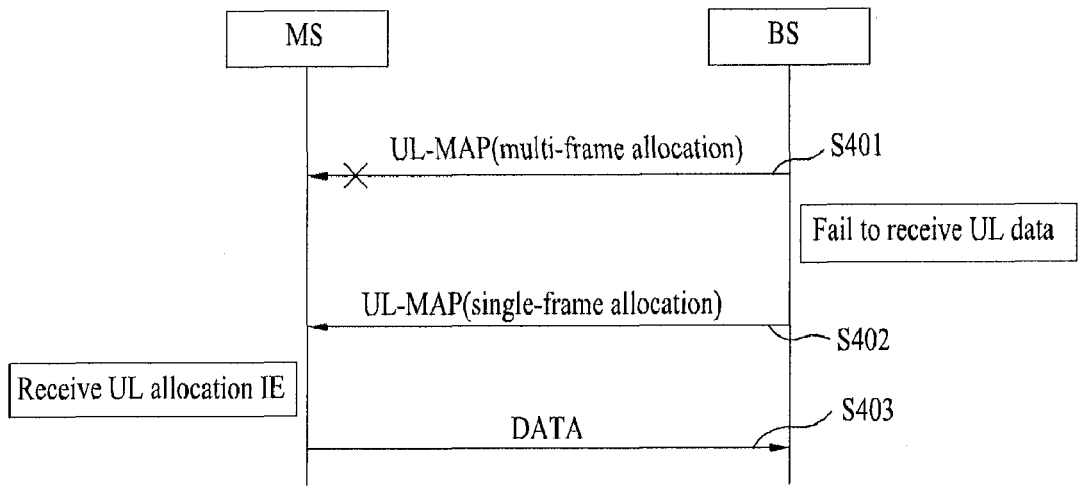
FIG. 4 illustrates an example wherein the allocation method is switched to a general allocation method when the MS has failed to receive a UL-MAP message or when the MS has failed to recognize an extended UIUC.

FIG. 4 illustrates an example wherein the allocation method is switched to a general allocation method when the MS has failed to receive a UL-MAP message or when the MS has failed to recognize an extended UIUC.

As shown in FIG. 4, the BS decides to collectively allocate a number of consecutive frames to the MS according to a system status and transmits a UL-MAP message including a multi-frame allocation IE to the MS. The multi-frame allocation IE of Table 3 or Table 5 can be used as the multi-frame allocation IE included in the UL-MAP message (S401).

However, the UL-MAP message may be lost in wired/wireless lines or an error may occur so that the MS may fail to normally receive the UL-MAP message. In this case, the MS cannot transmit data through a transmission region included in the UL-MAP message and the BS cannot receive data from the MS through the corresponding region.

If the MS fails to receive data through the allocated region at step S401, the BS attempts to switch the allocation method to a general resource region allocation method. That is, the BS allocates a transmission region to each frame and transmits the allocated transmission region to the MS through a UL-MAP (single-frame allocation) message. If the MS cannot recognize an extended UIUC, the MS cannot transmit data through consecutively allocated transmission regions. Accordingly, the BS can switch the allocation method to the general resource allocation method through a UL-MAP (single-frame allocation) message and thus can allocate transmission regions to the MS (S402).

The MS can transmit uplink data to the BS through the transmission region included in the UL-MAP message received at step S402 (S403).

In FIG. 4, if the MS cannot recognize the extended UIUC 0x0B, the MS may ignore a multi-frame allocation IE included in the UL-MAP message in another embodiment of the present invention. Accordingly, the resource allocation method used in the embodiments of the present invention needs to be compatible with the general resource allocation method. To guarantee compatibility with the general slot allocation scheme, the BS can transmit a UL-MAP message including a UL allocation start IE and a multi-frame allocation IE at step S401.

Even when the MS cannot recognize an extended UIUC included in the UL-MAP (multi-frame allocation) message received at step S401, the MS can transmit uplink data to the BS using the uplink allocation start IE.

For example, let us assume that, when a number of MSs are included in a cell area, the BS allocates a resource region (transmission region) to the first MS using a general block allocation scheme, allocates a resource region to the second MS using a general multi-frame allocation scheme, and allocates a resource region to the third MS using a general slot allocation scheme.

Here, in the case where the third MS cannot recognize the multi-frame allocation IE, the third MS determines that resource regions subsequent to the resource region allocated to the second MS are those allocated to the third MS using an uplink allocation start IE. The third MS can transmit uplink data through a transmission region that has been determined to be that of the third MS.

Accordingly, transmission of a UL-MAP message including the uplink allocation start IE guarantees compatibility between MSs which use the general resource allocation scheme and MSs which can use the multi-frame allocation IE suggested in the embodiments of the present invention.

Figure 5:
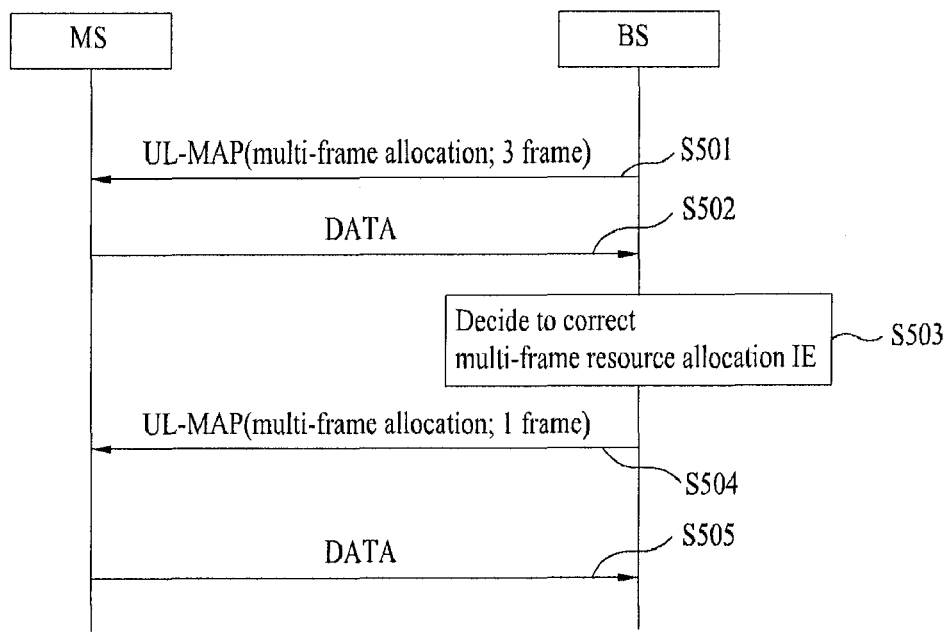
FIG. 5 illustrates a method in which the number of frames allocated to an MS is corrected after a number of consecutive frames are collectively allocated to the MS according to another embodiment of the present invention.

FIG. 5 illustrates a method in which the number of frames allocated to an MS is corrected after a number of consecutive frames are collectively allocated to the MS according to another embodiment of the present invention.

As shown in FIG. 5, the BS decides to allocate three consecutive frames to an MS and transmits a UL-MAP message including a multi-frame allocation IE to the MS (S501). Here, the format of the multi-frame allocation IE used at step S501 may be the format illustrated in Table 3 or Table 5.

The MS can determine that three frames have been consecutively allocated to the MS through the UL-MAP message received at step S501. Transmission regions allocated in the three consecutive frames are identical. Accordingly, the MS can sequentially transmit uplink data to the BS through the allocated transmission regions in the frames (S502).

The BS may decide to correct the number of frames allocated to the MS to "1" according to changes in data transmission environments or system requirements (S503).

Accordingly, the BS transmits a multi-frame allocation IE including single frame allocation information to the MS through a UL-MAP message (S504).

Through the UL-MAP message received at step 504, the MS determines that the number of frames allocated to the MS is "1" and changes the number of frames capable of transmitting data from "2" to "1". Thereafter, the MS can transmit uplink data to the BS through the frame allocated to the MS (S505).

According to the embodiments of the present invention described above with reference to FIG. 5, multiple frames are allocated to the MS using multi-frame allocation information, thereby reducing the number of transmissions of a MAP message and reducing downlink overhead and signaling overhead of the MS.

Although the method illustrated in FIG. 2 to FIG. 5 has been described with reference to the case where resource regions are allocated in uplink, the method of FIG. 2 to FIG. 5 can also be applied to the case where resource regions are allocated in downlink according to system requirements. When the method is applied to downlink, a DL-MAP message can be used instead of a UL-MAP message and an extended DIUC parameter can be used instead of an extended UIUC parameter.

The following Table 6 shows a comparison of overhead of the resource allocation method according to an embodiment of the present invention with that of the general resource allocation method.

TABLE 6

| Item | No. User | Total bits (Max) | | | Total bits (Min) |
|---|---|---|---|---|---|
| | | 2 frames | 3 frames | 4 frames | |
| UIUC 1~10 | 1 | 64 | 96 | 128 | — |
| | 2 | 128 | 192 | 256 | — |
| | 3 | 192 | 288 | 384 | — |
| | 4 | 256 | 384 | 512 | — |
| | 5 | 320 | 480 | 640 | — |
| | 6 | 384 | 576 | 768 | — |
| | 7 | 448 | 62 | 86 | — |
| Multi-frame allocation | | | | | |
| (block allocation) | 1 | 156 | 200 | 244 | 68 |
| | 2 | 224 | 268 | 312 | 136 |
| | 3 | 292 | 336 | 380 | 204 |
| | 4 | 360 | 404 | 448 | 272 |
| | 5 | 428 | 472 | 516 | 340 |
| | 6 | 496 | 540 | 584 | 408 |
| | 7 | 564 | 608 | 652 | 476 |

TABLE 6-continued

| Item | No. User | Total bits (Max) | | | Total bits (Min) |
|---|---|---|---|---|---|
| | | 2 frames | 3 frames | 4 frames | |
| Reduced | 1 | 148 | 192 | 236 | 60 |
| multi-frame | 2 | 208 | 252 | 296 | 120 |
| allocation | 3 | 268 | 312 | 356 | 180 |
| (block | 4 | 328 | 372 | 416 | 240 |
| allocation) | 5 | 388 | 432 | 476 | 300 |
| | 6 | 448 | 492 | 536 | 360 |
| | 7 | 508 | 552 | 596 | 420 |
| (slot | 1 | 148 | 192 | 236 | 60 |
| allocation) | 2 | 200 | 244 | 288 | 112 |
| | 3 | 252 | 296 | 340 | 164 |
| | 4 | 304 | 348 | 392 | 216 |
| | 5 | 356 | 400 | 444 | 268 |
| | 6 | 408 | 452 | 496 | 320 |
| | 7 | 460 | 504 | 548 | 372 |

As can be seen from Table 6, the general resource allocation scheme is a slot allocation scheme of UIUC 1 to 10 having lowest overhead, and overhead of a total of 32 bits (10 bits for the duration, 2 bits for the repetition coding indication, and 20 bits for the CID and UIUC) occurs every frame. The overhead increases as the number of users increases.

However, a multi-frame allocation IE that uses the block allocation scheme according to the embodiment of the present invention causes overhead of up to 112 bits (48 bits for the multi-frame allocation IE, 24 bits for the UL allocation start IE, and 40 bits for the CID and UIUC) in the first frame and causes overhead of up to 44 bits (24 bits for the UL allocation start IE and 20 bits for the CID and UIUC) in each subsequent frame. Here, the UL allocation start IE causes overhead of only 24 bits regardless of the number of users.

The minimum overhead that may occur for the multi-frame allocation IE is 68 bits (48 bits for the multi-frame allocation IE and 20 bits for the CID and UIUC) regardless of the number of allocated frames.

In addition, a reduced multi-frame allocation IE which uses the block allocation scheme causes overhead of up to 104 bits (40 bits for the reduced multi-frame allocation IE, 24 bits for the UL allocation start IE, and 40 bits for the CID and UIUC) in the first frame and overhead of up to 44 bits (24 bits for the UL allocation start IE and 20 bits for the CID and UIUC) in each subsequent frame. Here, the UL allocation start IE causes overhead of only 24 bits regardless of the number of users. The minimum overhead that may occur for the reduced multi-frame allocation IE is 60 bits (40 bits for the reduced multi-frame allocation IE and 20 bits for the CID and UIUC) regardless of the number of allocated frames.

Finally, the overhead of the multi-frame allocation IE which uses the slot allocation scheme is equal to that of the reduced multi-frame allocation IE in the case where only one user is present and the difference between the two overheads increases as the number of users increases.

It can be seen from Table 6 that the overhead changes depending on whether or not the uplink allocation start IE is included or depending on the number of users allocated to one frame or the number of allocated frames and overhead occurring when the resource allocation method described in the embodiments of the present invention is used is significantly lower than that when the conventional resource allocation method is used.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It will be apparent that claims which are not explicitly dependent on each other can be combined to provide an embodiment or new claims can be added through amendment after this application is filed.

INDUSTRIAL APPLICABILITY

The present invention can be applied to a variety of wireless access systems. The embodiments of the present invention can be applied to various methods for allocating resource regions in wireless access systems. The embodiments of the present invention can also be applied to methods for collectively allocating resources of consecutive frames.

The invention claimed is:

1. A method for allocating resource regions in a broadband wireless access system, the method comprising:
    receiving a message from a base station by a mobile terminal, the message including allocation information used to collectively and consecutively allocate identical resource regions of consecutive frames, the identical resource regions comprising identical Orthogonal Frequency-Division Multiple Access (OFDMA) symbols and identical subchannels within each of the identical resource regions, the identical OFDMA symbols being a subset of a total number of OFDMA symbols within each of the identical resource regions, the identical subchannels being a subset of a total number of subchannels within each of the identical resource regions; and
    transmitting or receiving data by the mobile terminal through the allocated identical resource regions.

2. The method according to claim 1, wherein the message includes information indicating a resource allocation start time.

3. The method according to claim 2, further comprising:
    when the mobile terminal does not recognize the allocation information, transmitting or receiving the data using the information indicating the resource allocation start time, wherein the data is transmitted or received from the resource allocation start time.

4. The method according to claim 1, wherein the allocation information includes an extended Uplink Interval Usage Code (UIUC).

5. The method according to claim 1, wherein the message includes subchannel offset information, a number of subchannels, OFDMA symbol offset information, a number of OFDMA symbols, and a number of allocated frames.

6. The method according to claim 1, wherein the message includes slot offset information, information about a duration of an allocated slot.

7. The method according to claim 1, wherein the step of transmitting or receiving the data includes consecutively transmitting or receiving the data through the allocated identical wireless resource regions using the allocation information included in the message.

8. A method for allocating resource regions in a broadband wireless access system, the method comprising:
    transmitting a message by a base station to a mobile terminal, the message including allocation information used to collectively and consecutively allocate identical resource regions of consecutive frames, the identical resource regions comprising identical Orthogonal Frequency-Division Multiple Access (OFDMA) symbols and identical subchannels within each of the identical resource regions, the identical OFDMA symbols being a subset of a total number of OFDMA symbols within each of the identical resource regions, the identical subchannels being a subset of a total number of subchannels within each of the identical resource regions; and receiving data by the base station through the allocated identical resource regions.

9. The method according to claim 8, wherein the message includes information indicating a resource allocation start time.

10. The method according to claim 8, further comprising:

transmitting a second message to the mobile terminal, wherein the second message includes corrected allocation information used to allocate a corrected resource region to the mobile terminal.

* * * * *